(12) United States Patent
Yao et al.

(10) Patent No.: US 10,281,683 B2
(45) Date of Patent: May 7, 2019

(54) IMAGING LENS SYSTEM

(71) Applicant: Apple Inc., Cupertino, CA (US)

(72) Inventors: Yuhong Yao, San Jose, CA (US); Yoshikazu Shinohara, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/663,474

(22) Filed: Jul. 28, 2017

(65) Prior Publication Data

US 2018/0031808 A1 Feb. 1, 2018

Related U.S. Application Data (60) Provisional application No. 62/369,609, filed on Aug. 1, 2016.

(51) Int. Cl.
| | |
|---|---|
| *G02B 3/02* | (2006.01) |
| *G02B 13/00* | (2006.01) |
| *G02B 9/62* | (2006.01) |
| *H04N 5/335* | (2011.01) |

(52) U.S. Cl.
CPC ........... *G02B 13/0045* (2013.01); *G02B 9/62* (2013.01); *H04N 5/335* (2013.01)

(58) Field of Classification Search
CPC ...................................... G02B 7/025
USPC ........................................ 359/793
See application file for complete search history.

(56) References Cited

U.S. PATENT DOCUMENTS

| | | |
|---|---|---|
| 9,488,808 B1 | 11/2016 | Chen et al. |
| 2013/0070346 A1* | 3/2013 | Hsu .................. G02B 9/62 359/713 |
| 2013/0342918 A1 | 12/2013 | Kubota et al. |
| 2015/0338607 A1 | 11/2015 | Liao et al. |

(Continued)

FOREIGN PATENT DOCUMENTS

| | | |
|---|---|---|
| JP | 201423247 | 11/2016 |
| TW | 201435383 | 9/2014 |
| TW | 201437673 | 10/2014 |

OTHER PUBLICATIONS

International Search Report and Written Opinion from PCT/US2017/044627, Apple Inc., pp. 1-17.

(Continued)

*Primary Examiner* — James C. Jones
(74) *Attorney, Agent, or Firm* — Robert C. Kowert; Meyertons, Hood, Kivlin, Kowert & Goetzel, P.C.

(57) ABSTRACT

Compact lens systems are described that may be used in small form factor cameras. The lens system may include six lens elements with refractive power, and may provide low F-numbers with wide field of view while maintaining or improving imaging quality and package size when compared to other compact lens systems. The lens system may, for example, provide a focal ratio of 2.1 or less (e.g., 1.8), with full field of view within a range of 70 to 90 degrees (e.g., 81 degrees). The lens system may conform to a criterion for compactness TTL/ImageH<1.7, where TTL is the total track length of the lens system, and ImageH is the semi-diagonal image height on the image plane at the photosensor. Lens system parameters and relationships may be selected at least in part to reduce, compensate, or correct for optical aberrations and lens artifacts and effects across the field of view.

20 Claims, 8 Drawing Sheets

(56) References Cited

U.S. PATENT DOCUMENTS

2015/0370042 A1* 12/2015 Chen .................. G02B 13/0045
359/713
2016/0187619 A1   6/2016 Tang et al.
2017/0090156 A1   3/2017 Hsu et al.
2017/0184822 A1   6/2017 Shi

OTHER PUBLICATIONS

Invitation to Pay Fees from PCT/US2017/044627, dated Oct. 19, 2017, Apple Inc., pp. 1-13.
Office Action from Taiwan Application No. 106125951, dated May 14, 2018 (Taiwan version and English translation), Apple Inc., pp. 1-17.

* cited by examiner

IMAGING LENS SYSTEM

PRIORITY INFORMATION

This application claims benefit of priority of U.S. Provisional Application Ser. No. 62/369,609 entitled "IMAGING LENS SYSTEM" filed Aug. 1, 2016, the content of which is incorporated by reference herein in its entirety.

BACKGROUND

Technical Field

This disclosure relates generally to camera systems, and more specifically to high-resolution, small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to to provide an imaging lens system that is capable of capturing high brightness, high resolution images under the physical constraints imposed by small form factor cameras.

SUMMARY OF EMBODIMENTS

Embodiments of the present disclosure may provide a compact imaging lens system including six lens elements that may be used in a camera and that provide a low F-number (2.1 or less, e.g., 1.8), wide field of view within a range of 70 to 90 degrees (e.g., 81 degrees) and short total track length (e.g., @6 mm) that allow the camera to be implemented in a small package size while still capturing sharp, high-resolution images, making embodiments of the camera suitable for use in small and/or mobile multipurpose devices. The lens system includes six lens elements with refractive power arranged along an optical axis from a first lens on the object side to a sixth lens on the image side. In some embodiments, the power order of the lens system, from the first lens to the sixth lens, is PNPNPN, where P indicates a lens with positive refractive power, and N represents a lens with negative refractive power. Lens system parameters and relationships including but not limited to power distribution, lens shape, thickness, aperture location, geometry, position, materials, spacing, and the surface shapes of certain lens elements may be selected at least in part to reduce, compensate, or correct for optical aberrations and lens artifacts and effects across the field of view.

In some embodiments, the lens system may include an aperture stop located between the object side of the optical system and the second lens element for controlling the brightness of the optical system. In some embodiments, the aperture stop may be located at the first lens element at or behind the front vertex of the lens system. In some embodiments, the aperture stop may instead be located between the first and second lens elements. In some embodiments, the lens system may also include one or more internal stops, for example a secondary stop located at the image side surface of the fourth lens element. The internal stop(s) may, for example, help in aberration control in low F-number and wide FOV conditions by cutting off a percentage of the off-axis ray bundles.

In some embodiments, the lens system may satisfy one or more of the following relationships:

$$0.15 < Y_o/f_{system} < 0.55$$

$$0.5 < (f_{system}/f1) < 1$$

$$0.4 < (f_{system}/f3) < 0.78$$

$$(R9+R10)/(R9-R10) < -3.2$$

$$T_{34}/TTL > 0.07$$

$$Z_h/T_{34} > 0.5$$

where $f_{system}$ is the effective focal length of the lens system, Yo is the vertical distance between the outermost horizontal vertex of the image side surface of the fifth lens and the optical axis, f1 is effective focal length of the first lens, f3 is effective focal length of the third lens, R9 is radius of curvature of the object side surface of the fifth lens, and R10 is radius of curvature of the image side surface of the fifth lens, $T_{34}$ is the on-axis spacing between the third lens and fourth lens, and $Z_h$ is the off-axis spacing between the third lens and fourth lens at a vertical distance Hep (Hep=EPD*0.8/2), where EPD is the entrance pupil diameter).

In some embodiments, the lens system may satisfy a criterion for compactness as defined in the following relationship:

$$TTL/ImageH < 1.7$$

where ImageH is the semi-diagonal image height on the image plane at the photosensor.

In some embodiments, the first and third lenses are formed of optical materials with Abbe number Vd>50 (e.g., 56.0), and the second and fourth lenses are formed of optical materials with Abbe number Vd<30 (e.g., 20.4). The material and power configurations of lenses one through four may be selected to reduce chromatic aberrations. In some embodiments, the fifth and sixth lenses are formed of optical materials with Abbe number Vd>50 (e.g., 56.0), and may further limit the occurrence of excessive chromatic aberrations.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small form factor camera including a photosensor and a compact lens system are described. Embodiments of a compact lens system including six lens elements are described that may be used in the camera and that provide a low F-number (2.1 or less, e.g., 1.8), wide field of view within a range of 70 to 90 degrees (e.g., 81 degrees) and short total track length (e.g., @6 mm) that allow the camera to be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes than those described. In addition, embodiments of the camera system may be implemented as stand-alone digital cameras. In addition to still (single frame capture) camera applications, embodiments of the camera system may be adapted for use in video camera applications.

Embodiments of the compact lens system may be used in small form factor cameras to capture high brightness, high resolution images. The lens system includes six lens elements with refractive power. Lens system parameters and relationships including but not limited to power distribution, lens shape, thickness, aperture location, geometry, position, materials, spacing, and the surface shapes of certain lens elements may be selected at least in part to reduce, compensate, or correct for optical aberrations and lens artifacts and effects across the field of view including one or more of but not limited to vignetting, chromatic aberration, the field curvature or Petzval sum, and lens flare.

Figure 1A:
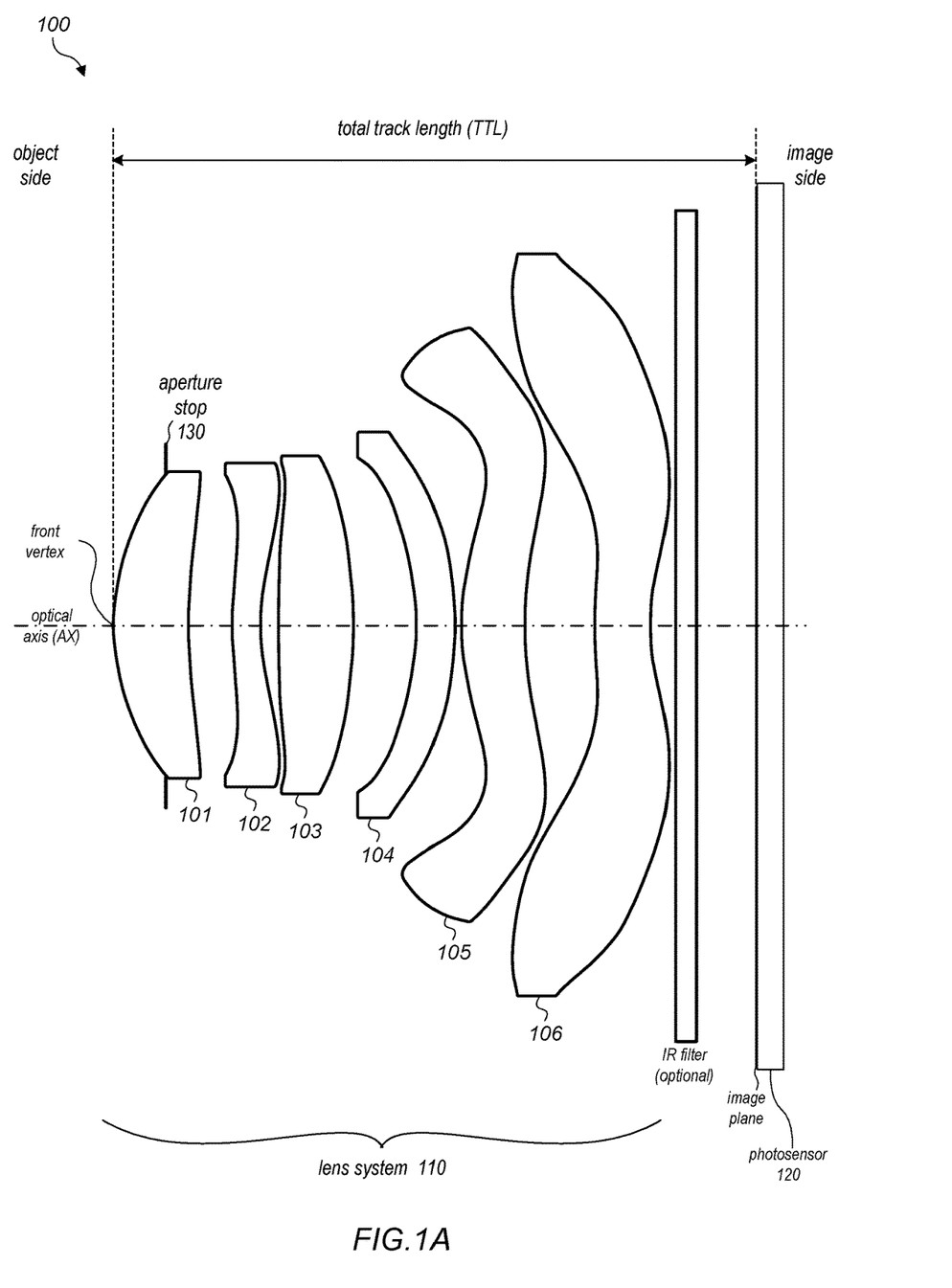
FIG. 1A is a cross-sectional illustration of an example embodiment of a compact camera including a compact lens system that includes six lens elements and an aperture stop.
Figure 1B:
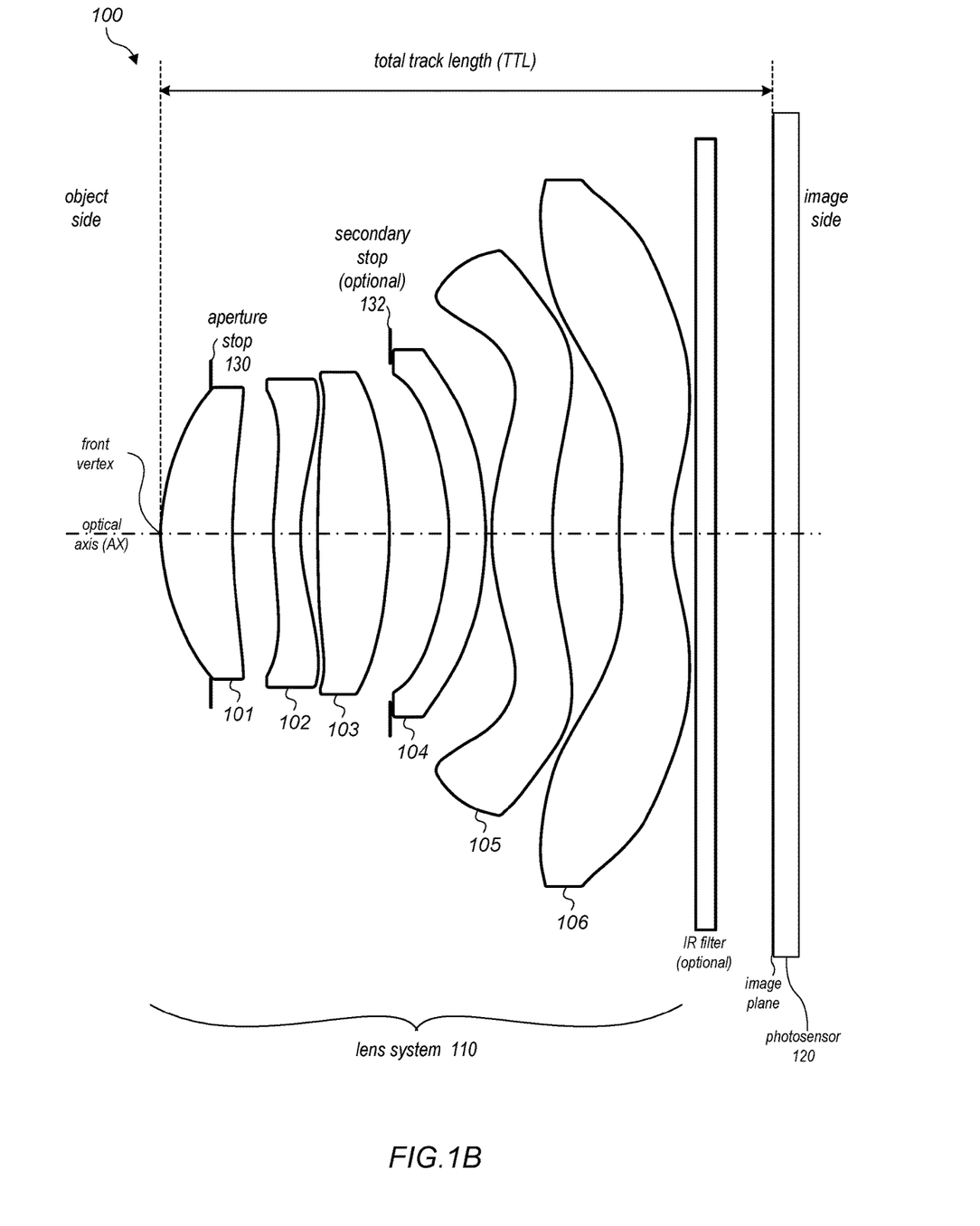
FIG. 1B is a cross-sectional illustration of an example embodiment of a compact camera including a compact lens system that includes six lens elements, a primary aperture stop, and a secondary aperture stop.

Non-limiting example embodiments of compact lens systems with six lens elements are described. FIG. 1A shows an example embodiment that includes six refracting lens elements in which an aperture stop is located at the first lens element and behind the front vertex of the lens system. FIG. 1B shows an example embodiment with six refracting lens elements and primary aperture stop located at the first lens element, and that also includes a secondary stop located at the fourth lens element. The example embodiments of compact lens systems with six lens elements as described herein may provide an f-number (focal ratio) that is less than 2.0, for example about 1.7, with focal length (f) of less than 5.0 mm (e.g., 4.5-4.7 mm), and a total track length (TTL) of 6.8 mm or less (e.g., 6 mm). Note, however, that these examples are not intended to be limiting, and that variations on the various parameters given for the lens systems are possible while still achieving similar results.

The refractive lens elements in embodiments of the lens system may, for example, be composed of a plastic material. In some embodiments, the refractive lens elements may be composed of an injection molded plastic material. However, other transparent materials may be used. Also note that, in a given embodiment, different ones of the lens elements may be composed of materials with different optical characteristics, for example different Abbe numbers and/or different refractive indices. The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

In FIGS. 1A and 1B, an example camera includes at least a compact lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In some embodiments, pixel size of the photosensor may be 1.2 microns or less, although larger pixel sizes may be used. In a non-limiting example embodiment, the photosensor may be manufactured according to a 1280× 720 pixel image format to capture 1 megapixel images. However, other pixel formats may be used in embodiments, for example 5 megapixel, 10 megapixel, or larger or smaller formats. In the Figures, an example photosensor with a full diagonal dimension of 8 mm (semi-diagonal 4 mm) is described; however, larger or smaller photosensors may be used with appropriate adjustment of the lens system dimensions.

The lens system may also include an aperture stop located between the object side of the optical system and the second lens element for controlling the brightness of the optical system. In some embodiments, the aperture stop may be located at the first lens element at or behind the front vertex of the lens system as shown in FIG. 1A. In some embodiments, the aperture stop may instead be located between the first and second lens elements. In some embodiments, the lens system may also include one or more secondary stops, for example a secondary stop located at the image side surface of the fourth lens element as shown in FIG. 1B, and/or a secondary stop located at the image side surface of the third lens element. The secondary stop(s) may help in aberration control.

The camera may also, but does not necessarily, include an infrared (IR) filter, for example located between the last or sixth lens element of the lens system and the photosensor. The IR filter may, for example, be composed of a glass material. However, other materials may be used. In some embodiments, the IR filter does not have refractive power, and does not affect the effective focal length f of the lens system. In some embodiments, instead of an IR filter as shown in the Figures, a coating may be used on one or more of the lens elements, or other methods may be used, to provide IR filtering. Further note that the camera may also include other components than those illustrated and described herein.

In the camera, the lens system forms an image at an image plane (IP) at or near the surface of the photosensor. The image size for a distant object is directly proportional to the effective focal length f of a lens system. The total track length (TTL) of the lens system is the distance on the optical axis (AX) between the front vertex at the object side surface of the first (object side) lens element and the image plane. The ratio of total track length to focal length (TTL/f) is referred to as the telephoto ratio. To be classified as a telephoto lens system, TTL/f is less than or equal to 1. For a non-telephoto lens system, the telephoto ratio is greater than 1.

In the non-limiting example embodiments described herein (see FIGS. 1A and 1B), the lens system may be configured such that the effective focal length f of the lens system is at or about 4.51 mm. The non-limiting example embodiments shown in FIGS. 1A and 1B may be configured such that the F-number is at or about 1.68. The lens system may, for example, be configured as shown in the examples to satisfy specified optical, imaging, and/or packaging constraints for particular camera system applications. Note that the F-number, also referred to as the focal ratio or f/#, is defined by f/D, where D is the diameter of the entrance pupil, i.e. the effective aperture. As an example, at f=4.51 mm, an F-number of 1.68 is achieved with an effective aperture of @2.68 mm. The example embodiment may, for example, be configured with a full field of view (FOV) at or about 81 degrees, and half field of view of 40.5 degrees. Total track length (TTL) of the example embodiments may be at or about 6.0 mm. Telephoto ratio (TTL/f) of the example embodiments is thus at or about 1.33. A photosensor with a full diagonal dimension of 8 mm (semi-diagonal 4 mm) is used.

However, note that the focal length f, F-number, TTL, photosensor size, and/or other lens system and camera parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, TTL, aperture stop location, F-number, field of view (FOV), telephoto ratio, photosensor size, imaging performance requirements, and packaging volume or size constraints.

In some embodiments, the lens system may be adjustable. For example, in some embodiments, a lens system as described herein may be equipped with an adjustable iris (entrance pupil) or aperture stop. Using an adjustable aperture stop, the F-number (focal ratio, or f/#) may be dynamically varied within a range. For example, if the lens system is well corrected at f/1.7, at a given focal length f and FOV, then the focal ratio may be varied within a range of 1.4 to 8 (or higher) by adjusting the aperture stop assuming that the aperture stop can be adjusted to the F-number setting. In some embodiments, the lens system may be used at faster focal ratios (<1.7) by adjusting the aperture stop at the same FOV (e.g. 81 degrees), possibly with degraded imaging quality performance, or with reasonably good performance at a smaller FOV.

While ranges of values may be given herein as examples for adjustable cameras and lens systems in which one or more optical parameters may be dynamically varied (e.g., using an adjustable aperture stop), embodiments of camera systems that include fixed (non-adjustable) lens systems in which values for optical and other parameters are within these ranges may be implemented.

Referring to embodiments as illustrated in FIGS. 1A and 1B, an example camera 100 includes at least a compact lens system 110 and a photosensor 120. The camera 100 may include an aperture stop 130, for example at the first lens element and at or behind the front vertex of the lens system 110, for controlling brightness of the optical system. In some embodiments, the aperture stop 130 may instead be located between the first and second lens elements. In some embodiments, the camera may also include a secondary stop 132 as illustrated in FIG. 1B. The camera 100 may also, but does not necessarily, include an infrared (IR) filter, for example located between the lens system 110 and the photosensor 120. The IR filter may act to reduce or eliminate interference of environmental noises on the photosensor 120 and/or to block infrared radiation that could damage or adversely affect the photosensor 120, and may be configured so as to have no effect on f.

A compact lens system 110 of a camera 100 may include six lens elements (101-106 in lens system 110 of FIGS. 1A and 1B) with refractive power and lens system effective focal length f, arranged along an optical axis AX in order from an object side to an image side:

a first lens element L1 (101) with positive refractive power;

a second lens element L2 (102) with negative refractive power;

a third lens element L3 (103) with positive refractive power;

a fourth lens element L4 (104) with negative refractive power;

a fifth lens element L5 (105) with positive refractive power; and a sixth lens element L6 (106) with negative refractive power.

Thus, the power order of the lens system 110, from the first lens 101 to the sixth lens 106, is PNPNPN, where P indicates a lens with positive refractive power, and N represents a lens with negative refractive power.

In some embodiments, lens 101 has a convex object-side surface in the paraxial region, lens 102 has a concave image-side surface in the paraxial region, lens 103 has a convex image-side surface in the paraxial region, and lens 104 has a convex image-side surface in the paraxial region.

Figure 2:
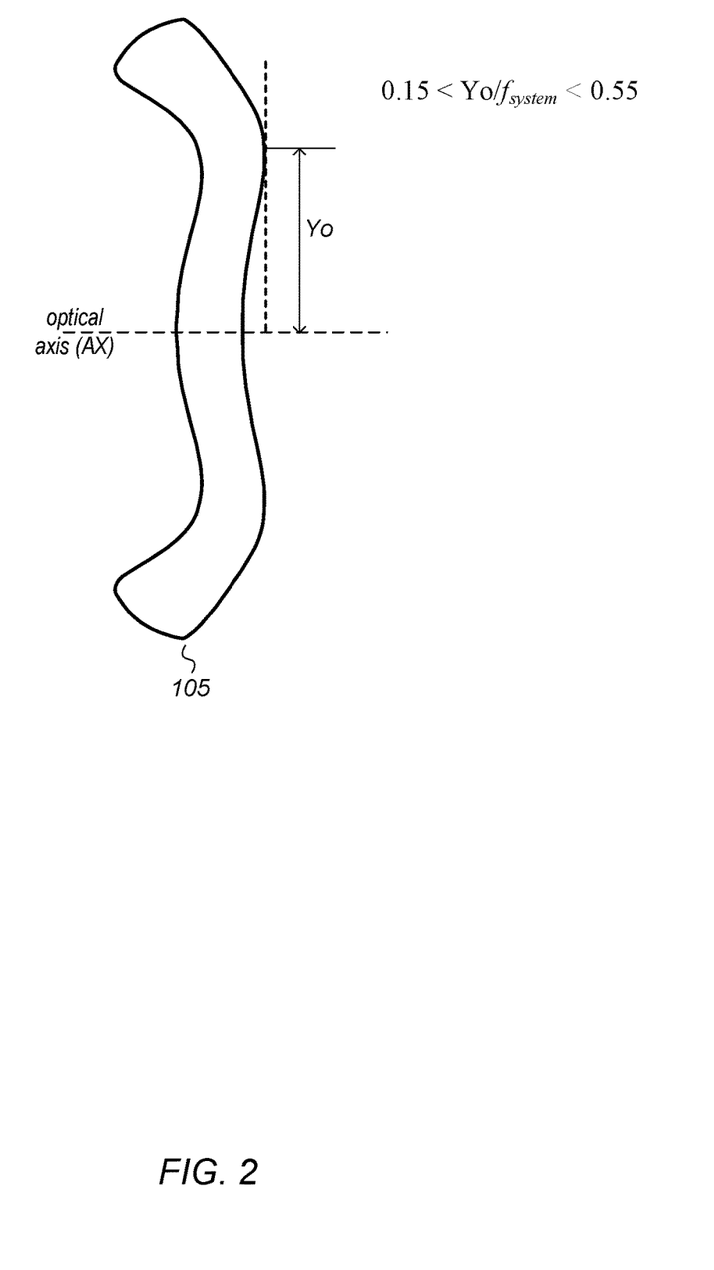
FIG. 2 illustrates design aspects of the fifth lens element in a lens system as illustrated in FIGS. 1A and 1B, according to some embodiments.

In some embodiments, lens 105 has a convex object-side surface in the paraxial region and a concave image-side surface in the paraxial region. Both the object-side surface and the image-side surface of lens 105 are aspheric. The object side surface of lens 105 has at least one part being concave near the peripheral region and the image-side surface has at least one part being convex near the peripheral region. Referring to FIG. 2, Yo is the vertical distance between the outermost horizontal vertex of the image side surface of lens 105 and the optical axis. In some embodiments, Yo satisfies the following relationship;

$$0.15 < Yo/f_{system} < 0.55$$

where $f_{system}$ is the effective focal length of the lens system 110.

In some embodiments, lens 106 has a convex object-side surface in the paraxial region and at least one part being concave along the entire surface. Lens 106 also has a concave image-side surface in the paraxial region and at least one part being convex along the entire surface. Both surfaces of lens 106 are aspheric.

In some embodiments, lens system 110 may satisfy one or more of the following relationships:

$$0.5 < (f_{system}/f1) < 1$$

$$0.4 < (f_{system}/f3) < 0.78$$

$$(R9+R10)/(R9-R10) < -3.2$$

where $f_{system}$ is the effective focal length of the lens system 110, f1 is effective focal length of lens 101, f3 is effective focal length of lens 103, R9 is radius of curvature of the object side surface of lens 105, and R10 is radius of curvature of the image side surface of lens 105. Note that the radius of curvature may be the fitted value of the lens surface shape from X-ray scanned structure.

Figure 3:
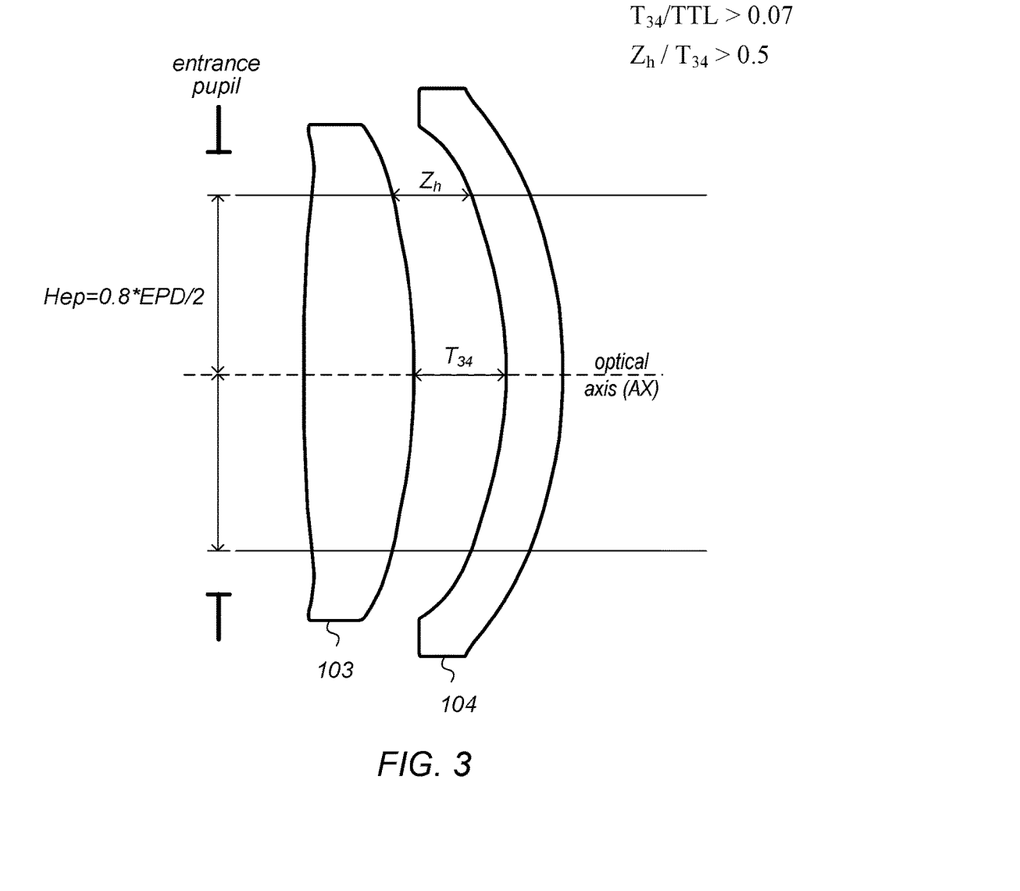
FIG. 3 illustrates design aspects and relationships of the third and fourth lens elements in a lens system as illustrated in FIGS. 1A and 1B, according to some embodiments.

Referring to FIG. 3, with respect to the optical axis, the on-axis spacing between lens 103 and lens 104 is $T_{34}$, the off-axis spacing between lens 103 and lens 104 at a vertical distance Hep (Hep=EPD*0.8/2), where EPD is the entrance pupil diameter) is defined as $Z_h$. The following relationships may be satisfied:

$$T_{34}/TTL > 0.07$$

$$Z_h/T_{34} > 0.5$$

where TTL is the total track length of the system focusing at infinity conjugate and is measured between the object side surface of lens 101 or the aperture stop, whichever comes closer to the object, to the image plane.

In some embodiments, lenses 101 and 103 are formed of optical materials with Abbe number Vd>50, and lenses 102 and 104 are formed of optical materials with Abbe number Vd<30. The material and power configurations of lenses 101-104 may be selected to reduce chromatic aberrations. In some embodiments, lenses 105 and 106 are formed of optical materials with Abbe number Vd>50, and may further limit the occurrence of excessive chromatic aberrations.

Embodiments of a lens system 110 may be implemented to be compact for use in small form factor cameras for consumer electronics products such as smartphones and tablet/pad devices. A criterion for compactness of the lens system may be defined in the following relationship:

$$TTL/ImageH < 1.7$$

where ImageH is the semi-diagonal image height on the image plane at the photosensor 120. In the example lens system as defined in Tables 1-3, total track length (TTL) is about 6.0 mm, and a photosensor with semi-diagonal image height of about 4 mm is used. The relationship (TTL/ImageH<1.7) for the example embodiments (6 mm/4 mm=1.5) is thus satisfied. Note that this criterion for compactness allows for proportionally longer TTL when using larger photosensors, and proportionally shorter TTL when using smaller photosensors. For example, TTL of a lens system for a photosensor with ImageH of about 3 mm would be 5.1 mm or less, and TTL of a lens system for a photosensor with ImageH of about 5 mm would be 8.5 mm or less.

As shown in FIG. 1B, some embodiments of lens system 110 system may include one or more internal stops (e.g., secondary stop 132 at lens 104) in addition to the aperture stop 130. The internal stop(s) 132 may, for example, help in aberration control in low F-number and wide FOV conditions by cutting off a percentage of the off-axis ray bundles, which at low F-number and wide FOV conditions tend to have more extreme aberrations than ray bundles closer to the optical axis. The lens system 110 (e.g., lens elements 104-106) may be designed to compensate for loss of illumination and possible vignetting that may result from the internal stop(s) 132.

Figure 4:
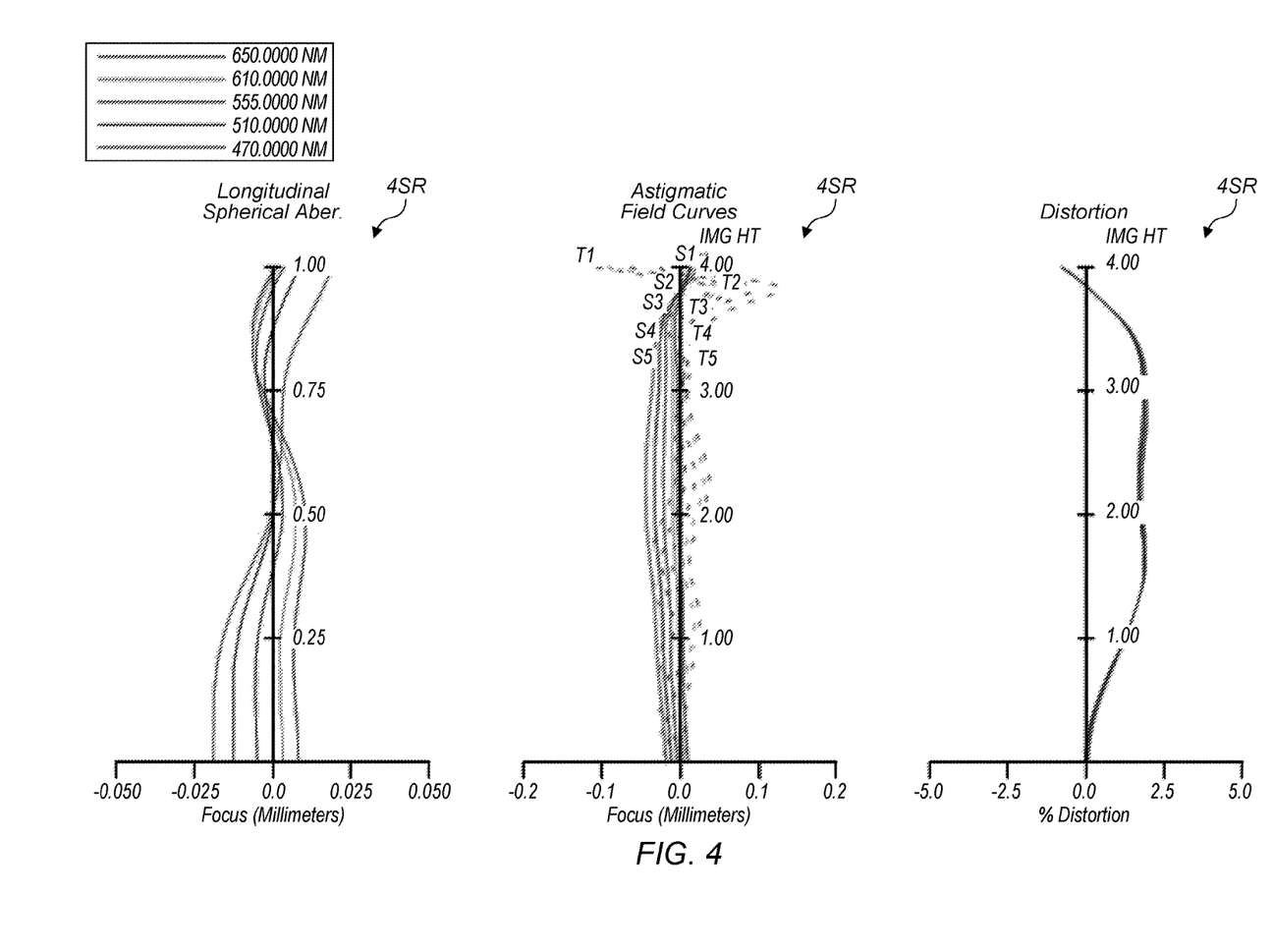
FIG. 4 is a graph illustrating the modulation transfer function (MTF) for a lens system as illustrated in FIGS. 1A-3, according to some embodiments.

FIG. 4 is a graph illustrating the modulation transfer function (MTF) for a lens system as illustrated in FIGS. 1A-3, according to some embodiments. FIG. 4 shows the lens MTF evaluated at 0 field, 0.4 field, 0.7 field and full field respectively. MTFs at are higher than 0.5 at 100 line pairs (lp)/mm, showing good contrast for high-resolution imaging and rendering high-quality images using high-resolution sensors.

Figure 5:
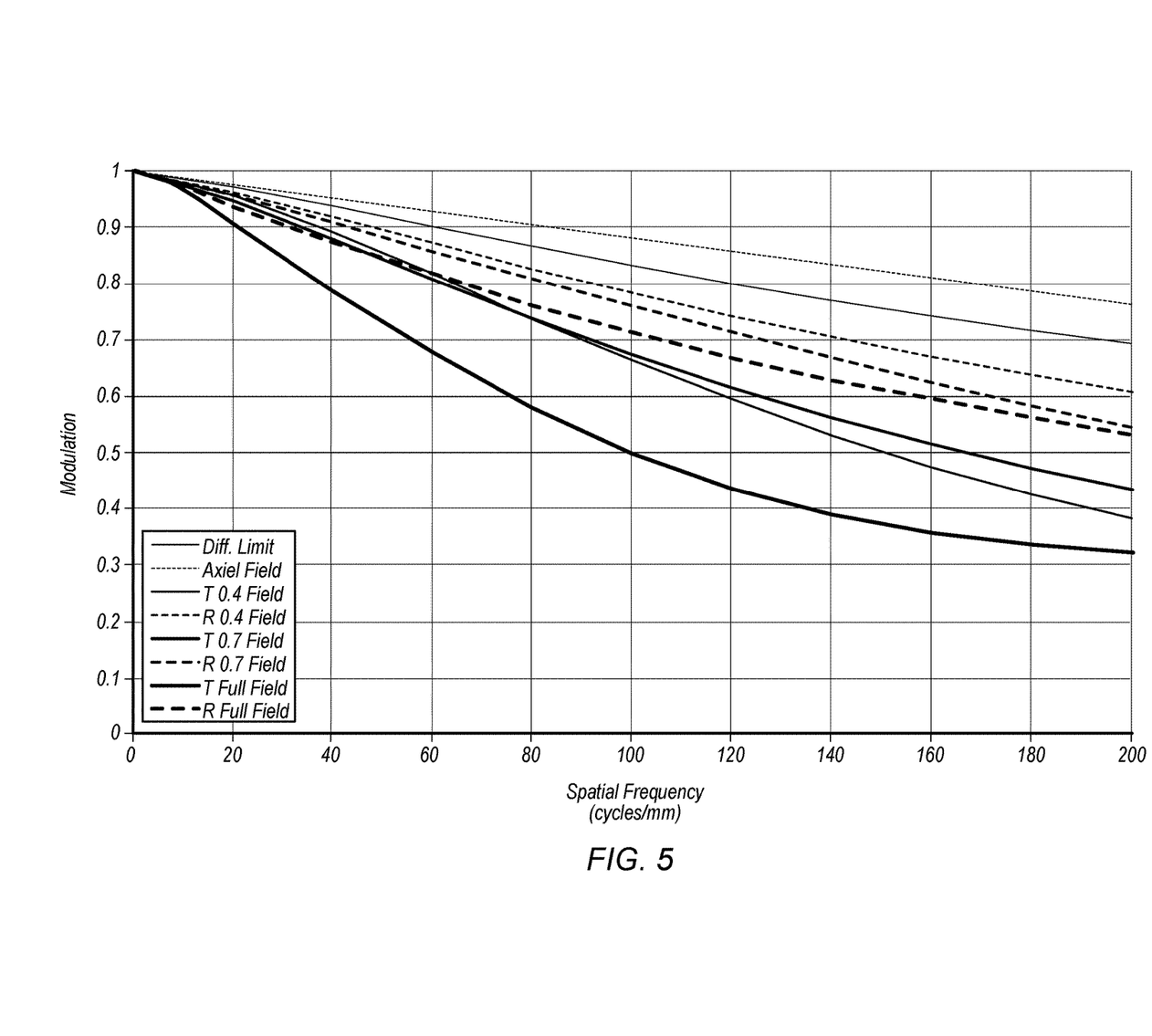
FIG. 5 shows the longitudinal spherical aberration, field curvature and distortion for a lens system as illustrated in FIGS. 1A-3, according to some embodiments.

FIG. 5 shows the longitudinal spherical aberration, field curvature and distortion for a lens system as illustrated in FIGS. 1A-3, according to some embodiments. As shown in FIG. 5, optical distortion across the field of view is controlled within 2%, while field curvature and astigmatism are well balanced across the field of view.

Figure 6:
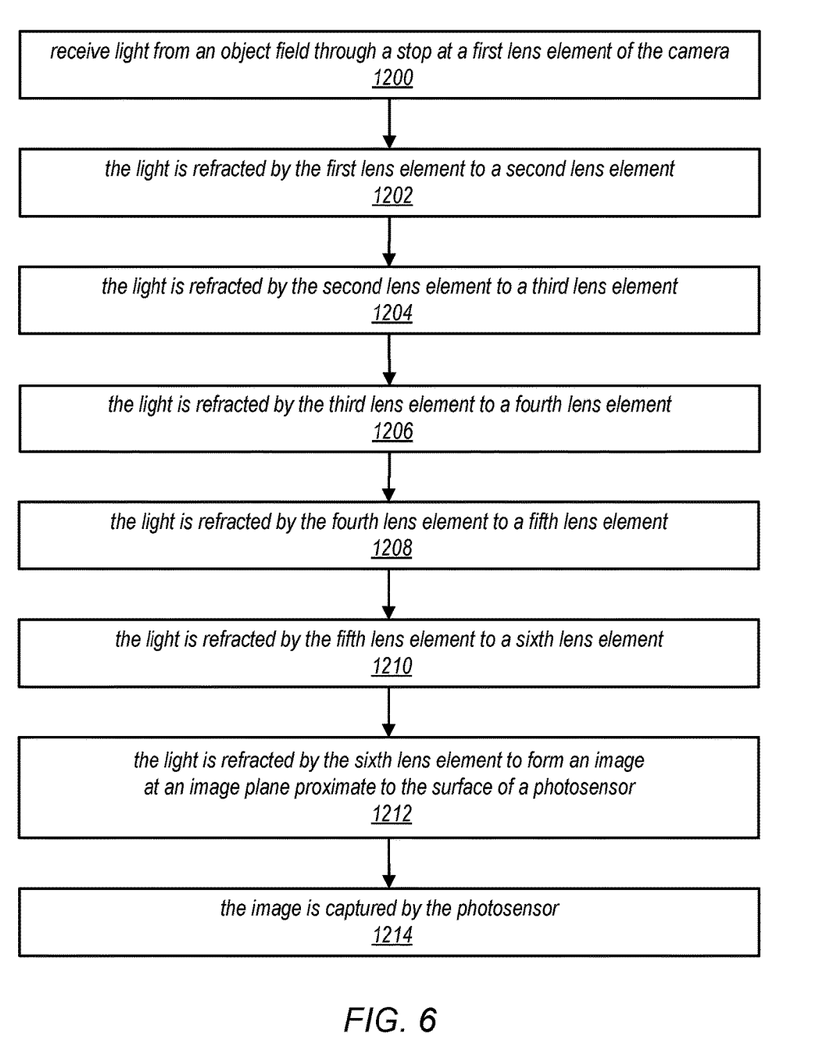
FIG. 6 is a flowchart of a method for capturing images using a camera as illustrated in FIGS. 1A through 5, according to some embodiments.

FIG. 6 is a high-level flowchart of a method for capturing images using a camera with a lens system that includes six lens elements as illustrated in FIGS. 1A through 5, according to some embodiments. As indicated at 1200, light from an object field in front of the camera is received through an aperture stop at a first lens element of the camera. As indicated at 1202, the first lens element refracts the light to a second lens element. Alternatively, in some embodiments, the aperture stop may be located between the first and second lens elements, and light from the object field may be received at the first lens element of the camera, and refracted through an aperture stop to the second lens element. In some embodiments, the first lens element may have positive refracting power. As indicated at 1204, the light is then refracted by the second lens element to a third lens element. In some embodiments, the second lens element may have negative refracting power. As indicated at 1206, the light is then refracted by the third lens element to a fourth lens element. In some embodiments, the third lens element may have positive refracting power. In some embodiments, the light may be refracted through a secondary stop to the fourth lens element. As indicated at 1208, the light is then refracted by the fourth lens element to a fifth lens element. In some embodiments, the fourth lens element may have negative refracting power. As indicated at 1210, the light is then refracted by the fifth lens element to a sixth lens element. In some embodiments, the fifth lens element may have positive refracting power. As indicated at 1212, the light is refracted by the sixth lens element to form an image at an image plane at or near the surface of a photosensor. In some embodiments, the sixth lens element may have negative refracting power. As indicated at 1214, the image is captured by the photosensor. While not shown in FIG. 6, in some embodiments, the light may pass through an infrared filter that may for example be located between the sixth lens element and the photosensor.

In some embodiments, the six lens elements referred to in FIG. 6 may be configured as illustrated in FIG. 1A or 1B, FIG. 2, and FIG. 3. However, note that variations on the example given in FIGS. 1A and 1B are possible while achieving similar optical results.

Example Lens System Tables

The following Tables provide example values for various optical and physical parameters of the example embodiment of the lens system and cameras as described in reference to FIGS. 1A through 3. In the Tables, all dimensions are in millimeters (mm) unless otherwise specified. L1, L2, L3, L4, L5, and L6 stand for refractive lenses 1, 2, 3, 4, 5, and 6, respectively. "S#" stands for surface number. The surface numbers (S#) of the elements as shown in the Tables are listed from a first surface 0 at the object plane to a last surface at the image plane/photosensor surface. A positive radius indicates that the center of curvature is to the right (object side) of the surface. A negative radius indicates that the center of curvature is to the left (image side) of the surface. "INF" stands for infinity (as used in optics). The thickness (or separation) is the axial distance to the next surface. FNO stands for F-number of the lens system. HFOV stands for half field of view. $f_{35\ mm}$ is the 35 mm equivalent focal length of the lens system. $V_x$ is the Abbe number of a respective lens element. Both f and $f_{system}$ stand for the effective focal length of the lens system, while $f_x$ stands for focal length of a respective lens element. R9 is radius of curvature of the object side surface of lens 5, and R10 is radius of curvature of the image side surface of lens 5. $T_{34}$ is the on-axis spacing between lens 3 and lens 4, while $Z_h$ is the off-axis spacing between lens 3 and lens 4 at a vertical distance Hep (see FIG. 3). TTL is total track length of the lens system focusing at infinity conjugate and is measured between the object side surface of lens 1 or the aperture stop, whichever comes closer to the object, to the image plane. ImageH is the semi-diagonal image height on the image plane.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d=(N_d-1)/(N_F-N_C),$$

where $N_F$ and $N_C$ are the refractive index values of the material at the F and C lines of hydrogen, respectively.

Referring to the Tables of aspheric coefficients (Tables 2A-2C), the aspheric equation describing an aspherical surface may be given by:

$$Z=(cr^2/(1+\mathrm{sqrt}[1-(1+K)c^2r^2]))+A_4r^4+A_6r^6+A_8r^8+A_{10}r^{10}+A_{12}R^{12}+A_{14}r^{14}+A_{16}r^{16}+A_{18}r^{18}+A_{20}r^{20}$$

where Z is the sag of surface parallel to the z-axis (the z-axis and the optical axis are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

TABLE 1

Lens system 110
FNO = 1.68, HFOV = 40.5 degrees

| Element | Surface (S#) | Radius (mm) | Thickness or separation (mm) | Refractive Index $N_d$ | Abbe Number $V_d$ |
|---|---|---|---|---|---|
| Object | 0 | INF | INF | | |
| | 1 | INF | 0.4759 | | |
| Stop | 2 | INF | −0.4759 | | |
| Lens 1 | *3 | 2.2807 | 0.7023 | 1.545 | 56.0 |
| | *4 | 6.4502 | 0.4002 | | |
| Lens 2 | *5 | 3.4806 | 0.27 | 1.661 | 20.4 |
| | *6 | 2.4649 | 0.1633 | | |
| Lens 3 | *7 | 35.5203 | 0.6987 | 1.545 | 56.0 |
| | *8 | −4.2925 | 0.5979 | | |
| Lens 4 | *9 (Aper) | −2.0342 | 0.36 | 1.661 | 20.4 |
| | *10 | −2.9113 | 0.05 | | |
| Lens 5 | *11 | 2.1215 | 0.6038 | 1.545 | 56.0 |
| | *12 | 3.9866 | 0.6618 | | |
| Lens 6 | *13 | 4.7486 | 0.5109 | 1.545 | 56.0 |
| | *14 | 1.7799 | 0.2311 | | |
| Filter | 15 | INF | 0.2 | 1.517 | 64.2 |
| | 16 | INF | 0.55 | | |
| Sensor | 17 | INF | 0 | | |

*Annotates aspheric surfaces (aspheric coefficients given in Tables 2A-2C)

TABLE 2A

Aspheric Coefficients (Lens System 110)

| | Surface (S#) | | | |
|---|---|---|---|---|
| | S3 | S4 | S5 | S6 |
| K | 0 | 0 | 0 | 0 |
| A4 | 1.400407E−04 | −1.774044E−02 | −1.047521E−01 | −7.172266E−02 |
| A6 | −2.874932E−03 | 1.114244E−02 | −5.338767E−03 | −1.704263E−02 |
| A8 | 8.591565E−03 | −8.412104E−03 | 1.266271E−02 | 3.367332E−02 |
| A10 | −7.709530E−03 | 3.928201E−03 | −1.084964E−03 | −1.864968E−02 |
| A12 | 3.398327E−03 | −5.330747E−04 | −1.347644E−03 | 3.007473E−03 |
| A14 | −5.911396E−04 | −2.233758E−04 | 0.000000E+00 | 0.000000E+00 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

TABLE 2B

Aspheric Coefficients (Lens System 110)

| | Surface (S#) | | | |
|---|---|---|---|---|
| | S7 | S8 | S9 | S10 |
| K | 0 | 0 | −9.513408E+00 | 0 |
| A4 | 2.701418E−02 | 4.510428E−03 | 9.526052E−03 | 2.752707E−02 |
| A6 | 7.438753E−03 | 2.112762E−02 | −1.055262E−02 | −1.890998E−02 |
| A8 | −1.987469E−02 | −3.905810E−02 | −1.127278E−02 | −4.949452E−03 |
| A10 | 2.191538E−02 | 3.441951E−02 | 9.330208E−03 | 9.323745E−03 |
| A12 | −1.629381E−02 | −1.654885E−02 | −1.927536E−03 | −3.476116E−03 |
| A14 | 4.906629E−03 | 3.517169E−03 | −5.858296E−04 | 3.368697E−04 |
| A16 | −4.552064E−04 | −2.179444E−04 | 1.388762E−04 | 2.721256E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

TABLE 2C

Aspheric Coefficients (Lens System 110)

| | Surface (S#) | | | |
|---|---|---|---|---|
| | S11 | S12 | S13 | S14 |
| K | −1 | 0 | −1 | −1 |
| A4 | −8.471980E−02 | −4.772999E−03 | −1.822094E−01 | −1.832420E−01 |
| A6 | 5.117806E−02 | 1.163544E−02 | 7.427701E−02 | 8.153634E−02 |
| A8 | −3.835797E−02 | −2.515107E−02 | −2.684964E−02 | −2.991474E−02 |
| A10 | 1.155769E−02 | 1.405819E−02 | 8.036824E−03 | 7.584544E−03 |
| A12 | 3.633475E−04 | −4.244921E−03 | −1.609680E−03 | −1.250846E−03 |
| A14 | −1.216130E−03 | 7.638757E−04 | 2.013430E−04 | 1.316853E−04 |
| A16 | 3.186663E−04 | −8.143673E−05 | −1.513545E−05 | −8.548754E−06 |
| A18 | −3.377138E−05 | 4.773803E−06 | 6.266069E−07 | 3.116102E−07 |
| A20 | 1.300412E−06 | −1.200065E−07 | −1.098847E−08 | −4.866188E−09 |

TABLE 3

Optical Definitions (Lens system 110)

| f [mm] | 4.51 | $f_{system}/f_3$ | 0.67 |
|---|---|---|---|
| FNO | 1.68 | (R9 + R10)/(R9 − R10) | −3.3 |
| HFOV[deg] | 40.5° | $T_{34}/TTL$ | 0.1 |
| $V_2$ | 20.5 | $Z_h/T_{34}$ | 0.85 |
| $V_4$ | 20.5 | TTL/ImageH | 1.5 |
| $f_{system}/f_1$ | 0.77 | | |

Example Computing Device

Figure 7:
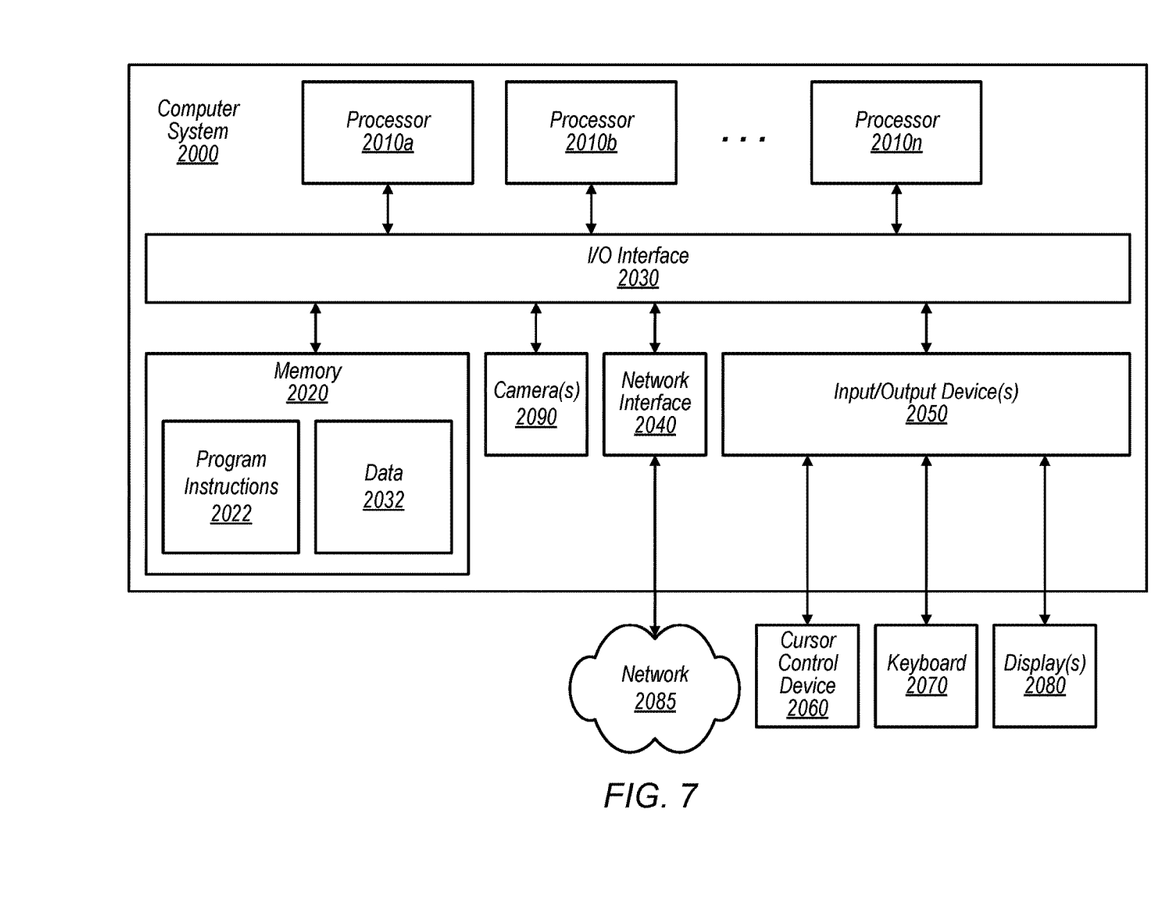
FIG. 7 illustrates an example computer system that may be used in embodiments.

FIG. 7 illustrates an example computing device, referred to as computer system 2000, that may include or host embodiments of a camera with a lens system as illustrated in FIGS. 2 through 6. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1A through 6, which may also be coupled to I/O interface 2030, or one or more cameras as described above with respect to FIGS. 1A through 6 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 7, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
   a plurality of refractive lens elements arranged along an optical axis of the lens system, wherein the plurality of lens elements includes, in order along the optical axis from an object side to an image side:
   a first lens element with positive refractive power;
   a second lens element with negative refractive power;
   a third lens element with positive refractive power;
   a fourth lens element with negative refractive power;
   a fifth lens element with positive refractive power; and
   a sixth lens element with negative refractive power;
   wherein the first lens element and the third lens element are composed of an optical material with Abbe number Vd>50, and wherein the second lens element and the fourth lens element are composed of an optical material with Abbe number Vd<30; and wherein the lens system satisfies the relationship:

$Z_h/T_{34}>0.5$, where $T_{34}$ is on-axis spacing between the third lens element and the fourth lens element and $Z_h$ is off-axis spacing between the third and fourth lens elements at a vertical distance Hep=EPD*0.8/2, where EPD is the entrance pupil diameter of the lens system.

2. The lens system as recited in claim 1, wherein the lens system satisfies the relationship:

TTL/ImageH<1.7, where TTL is total track length of the lens system, and ImageH is semi-diagonal image height at an image plane of the lens system.

3. The lens system as recited in claim 1, wherein the fifth lens element and the sixth lens element are composed of an optical material with Abbe number Vd>50.

4. The lens system as recited in claim 1, wherein the lens system satisfies the relationship:

$T_{34}$/TTL>0.07, where TTL is total track length of the lens system.

5. The lens system as recited in claim 1, wherein the lens system satisfies the relationship:

0.15<Yo/$f_{system}$<0.55, where Yo is vertical distance between an outermost horizontal vertex of an image side surface of the fifth lens element and the optical axis, and $f_{system}$ is effective focal length of the lens system.

6. The lens system as recited in claim 1, wherein the lens system satisfies the relationship:

0.5<($f_{system}$/f1)<1, where $f_{system}$ is effective focal length of the lens system, and f1 is effective focal length of the first lens element.

7. The lens system as recited in claim 1, wherein the lens system satisfies the relationship:

0.4<($f_{system}$/f3)<0.78, where $f_{system}$ is effective focal length of the lens system, and f3 is effective focal length of the third lens element.

8. The lens system as recited in claim 1, wherein the lens system satisfies the relationship:

(R9+R10)/(R9−R10)<−3.2, where R9 is radius of curvature of an object side surface of the fifth lens element, and R10 is radius of curvature of an image side surface of the fifth lens element.

9. The lens system as recited in claim 1, wherein the first lens element has a convex object-side surface in a paraxial region, the second lens element has a concave image-side surface in a paraxial region, the third lens element has a convex image-side surface in a paraxial region, and the fourth lens element has a convex image-side surface in a paraxial region.

10. The lens system as recited in claim 1, wherein the fifth lens element has a convex object-side surface in a paraxial region with at least one part of the object-side surface being concave in a peripheral region, and a concave image-side surface in a paraxial region with at least one part of the image-side surface being convex in a peripheral region.

11. The lens system as recited in claim 1, wherein the sixth lens element has a convex object-side surface in a paraxial region with at least one part of the object-side surface being concave in a peripheral region, and a concave image-side surface in a paraxial region with at least one part of the image-side surface being convex in a peripheral region.

12. The lens system as recited in claim 1, wherein the lens system further includes an aperture stop located between a front vertex of the lens system and the second lens element.

13. The lens system as recited in claim 12, wherein the lens system further includes at least one secondary aperture stop located between the first lens element and the sixth lens element.

14. A camera, comprising:
a photosensor configured to capture light projected onto a surface of the photosensor; and
a lens system configured to refract light from an object field located in front of the camera to form an image of a scene at an image plane at or near the surface of the photosensor, wherein the lens system includes six refractive lens elements arranged in order along an optical axis from a first lens element on an object side of the camera to a sixth lens element on an image side of the camera, wherein the lens system satisfies the relationships:

$T_{34}$/TTL>0.07, and $Z_h/T_{34}>0.5$, where $T_{34}$ is on-axis spacing between a third lens element and a fourth lens element, TTL is total track length of the lens system, and $Z_h$ is off-axis spacing between the third and fourth lens elements at a vertical distance Hep=EPD*0.8/2, where EPD is the entrance pupil diameter of the lens system.

15. The camera as recited in claim 14, wherein the first lens element and a third lens element are composed of an optical material with Abbe number Vd>50, wherein a second lens element and a fourth lens element are composed of an optical material with Abbe number Vd<30, and wherein a fifth lens element and the sixth lens element are composed of an optical material with Abbe number Vd>50.

16. The camera as recited in claim 14, wherein the lens system satisfies the relationships:

TTL/ImageH<1.7, 0.15<Yo/$f_{system}$<0.55, (R9+R10)/(R9−R10)<−3.2, 0.5<($f_{system}$/f1)<1, and 0.4<($f_{system}$/f3)<0.78, where ImageH is semi-diagonal image height at the image plane, Yo is vertical distance between an outermost horizontal vertex of an image side surface of a fifth lens element and the optical axis, $f_{system}$ is effective focal length of the lens system, R9 is radius of curvature of an object side surface of a fifth lens element, R10 is radius of curvature of an image side surface of the fifth lens element, f1 is effective focal length of the first lens element, and f3 is effective focal length of the third lens element.

17. The camera as recited in claim 14, wherein:
the first lens element has a convex object-side surface in a paraxial region;
a second lens element has a concave image-side surface in a paraxial region;
the third lens element has a convex image-side surface in a paraxial region;

the fourth lens element has a convex image-side surface in a paraxial region;

a fifth lens element has a convex object-side surface in a paraxial region with at least one part of the object-side surface being concave in a peripheral region and a concave image-side surface in a paraxial region with at least one part of the image-side surface being convex in a peripheral region; and the sixth lens element has a convex object-side surface in a paraxial region with at least one part of the object-side surface being concave in a peripheral region and a concave image-side surface in a paraxial region with at least one part of the image-side surface being convex in a peripheral region.

18. The camera as recited in claim 14, wherein power order of the lens system, from the first lens element to the sixth lens element, is PNPNPN, where P indicates a lens with positive refractive power, and N represents a lens with negative refractive power, and wherein at least one of the lens elements has at least one aspheric surface.

19. A device, comprising:
one or more processors;
one or more cameras; and
a memory comprising program instructions executable by at least one of the one or more processors to control operations of the one or more cameras;
wherein at least one of the one or more cameras is a camera comprising:
a photosensor configured to capture light projected onto a surface of the photosensor; and
a lens system configured to refract light from an object field located in front of the camera to form an image of a scene at an image plane at or near the surface of the photosensor, wherein the lens system includes six refractive lens elements arranged in order along an optical axis from a first lens element on an object side of the camera to a sixth lens element on an image side of the camera;
wherein a fifth lens element of the lens system has a convex object-side surface in a paraxial region with at least one part of the object-side surface being concave in a peripheral region, and a concave image-side surface in a paraxial region with at least one part of the image-side surface being convex in a peripheral region;
wherein the lens system satisfies the relationships:

$$0.4 < f_{system}/f3 < 0.78,$$

$$TTL/ImageH < 1.7,$$

$$(R9+R10)/(R9-R10) < -3.2, \text{ and}$$

$$0.15 < Yo/f_{system} < 0.55,$$

where f3 is effective focal length of a third lens element, TTL is total track length of the lens system, ImageH is semi-diagonal image height at the image plane, R9 is radius of curvature of an object side surface of the fifth lens element, R10 is radius of curvature of an image side surface of the fifth lens element, Yo is vertical distance between an outermost horizontal vertex of an image side surface of the fifth lens element and the optical axis, and $f_{system}$ is effective focal length of the lens system.

20. The device as recited in claim 19, wherein the first lens element and a third lens element are composed of an optical material with Abbe number Vd>50, the second lens element and the fourth lens element are composed of an optical material with Abbe number Vd<30, and the fifth lens element and the sixth lens element are composed of an optical material with Abbe number Vd>50.

* * * * *